(12) United States Patent
Jones

(10) Patent No.: US 10,899,516 B2
(45) Date of Patent: Jan. 26, 2021

(54) TIRE RAIN SHIELD

(71) Applicant: Alan Jones, Salem, OR (US)

(72) Inventor: Alan Jones, Salem, OR (US)

( * ) Notice: Subject to any disclaimer, the term of this patent is extended or adjusted under 35 U.S.C. 154(b) by 192 days.

(21) Appl. No.: 16/293,605

(22) Filed: Mar. 5, 2019

(65) Prior Publication Data

US 2020/0283206 A1   Sep. 10, 2020

(51) Int. Cl.
*B65D 59/06* (2006.01)
*B60C 19/04* (2006.01)
*B60B 7/14* (2006.01)

(52) U.S. Cl.
CPC .............. *B65D 59/06* (2013.01); *B60C 19/04* (2013.01); *B60B 7/14* (2013.01)

(58) Field of Classification Search
CPC ........ B65D 59/00; B65D 59/02; B65D 59/06; B65D 85/06; B60C 19/00; B60C 19/04; B60B 7/14
USPC ..... 301/37.103, 37.42; 206/304.2, 303, 304; 49/463; D12/605, 202, 204, 207, 208, D12/213; D21/779
See application file for complete search history.

(56) References Cited

U.S. PATENT DOCUMENTS

| | | | | |
|---|---|---|---|---|
| 1,351,261 A | * | 8/1920 | Miller | B60B 7/14 301/37.38 |
| 2,610,897 A | * | 9/1952 | Rebmann | A63C 17/22 301/5.7 |
| 2,869,262 A | * | 1/1959 | Lucas | G09F 21/045 40/587 |
| 3,528,705 A | * | 9/1970 | Oldroyd | B60B 7/04 301/37.42 |
| 4,067,621 A | * | 1/1978 | Reppert | B60B 7/00 301/108.3 |
| 4,447,091 A | * | 5/1984 | Nguyen | B60B 7/18 301/37.21 |
| 4,893,713 A | * | 1/1990 | Thomas | B65D 85/06 206/304 |
| 5,090,777 A | * | 2/1992 | Li | B60B 7/14 301/37.371 |
| 7,121,631 B2 | * | 10/2006 | Strzelczyk | B60B 7/0026 301/37.25 |
| 7,178,669 B2 | * | 2/2007 | Atkinson | A47F 7/04 206/304 |
| 7,806,484 B1 | * | 10/2010 | Young | B60J 11/10 301/37.104 |
| D867,966 S | * | 11/2019 | Barton | D12/213 |

(Continued)

FOREIGN PATENT DOCUMENTS

| | | | | |
|---|---|---|---|---|
| DE | 102014000089 A1 | * | 7/2015 | ............. B60B 7/08 |
| FR | 1490700 | * | 8/1967 | ............. B29C 73/06 |
| WO | WO-2012139186 A1 | * | 10/2012 | ............. B64F 5/50 |

*Primary Examiner* — Michael McCullough
(74) *Attorney, Agent, or Firm* — Mark S Hubert

(57) ABSTRACT

A tire rain protector made of a mushroom shaped polymer body having a reverse taper male thread formed thereon having a threadform with three varying geometric parameters. The thread thickness, thread height, and thread crest width all increase from the top of the tire rain protector body to the bottom of the body. These three features along with a thread that begins at the underside of the cap enable for a device that is easy to install and forms a secure tight seal on a tire. When installed, this dome-like device diverts rain from collecting into the concave liner (inner sidewalls) of a horizontally stacked tire.

10 Claims, 7 Drawing Sheets

(56) References Cited

U.S. PATENT DOCUMENTS

2008/0136247 A1\* 6/2008 Janty .................... B60B 7/0066
                                                    301/37.104
2011/0095596 A1\* 4/2011 King .................... A63C 17/002
                                                    301/37.101

\* cited by examiner

TIRE RAIN SHIELD

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a device that diverts the rain from accumulating in horizontally stacked tires so as to prevent the creation of a micro environment of standing water, ideal for the breeding of mosquitoes.

BACKGROUND

Mosquitoes as blood sucking insects are classified as vectors which are living organisms that can transmit infectious diseases between humans or from animals to humans. They ingest disease-producing microorganisms during a blood meal from an infected host (human or animal) and later inject it into a new host during their subsequent blood meal. Mosquitoes are the best-known disease vector.

More than half of the world's population lives in areas where the *Aedes aegypti* mosquito species is present. Diseases that are spread to people by this species of mosquito include Zika virus, West Nile virus, Chikungunya virus, dengue, and malaria. These Vector-borne diseases account for more than 17% of all infectious diseases, causing more than 700,000 deaths annually. The burden of these diseases is highest in tropical and subtropical areas and they disproportionately affect the poorest populations. Since 2014, major outbreaks of dengue, malaria, chikungunya yellow fever and Zika have afflicted populations, claimed lives and overwhelmed health systems in many countries.

Malaria causes more than 400 000 deaths every year globally, most of them children under 5 years of age. More than 3.9 billion people in over 128 countries are at risk of contracting dengue, with 96 million cases estimated per year. The worldwide incidence of dengue has risen 30-fold in the past 30 years, and more countries are reporting their first outbreaks of the disease.

It has been estimated that 30 percent of the mosquito population in third world countries are breed from stagnant rainwater captured in used tires. Generally used tires are not dealt with individually. It is more economical to accumulate great numbers of them before they are transported to recycling centers. Commonly they are stacked atop each other for special minimization. This allows rainwater to accumulate into multiple tires at once. Preventing the entry of rainwater into these used, discarded tires in junkyards, recycling and industrial facilities would be a substantial step in mosquito control efforts helping prevent outbreaks from these diseases.

Henceforth, an economical device that would shield used tire stacks from the accumulation of rainwater would fulfill a long felt need as outlined above. This new invention utilizes and combines known and new technologies in a unique and novel configuration to overcome the aforementioned problems and accomplish this.

BRIEF SUMMARY

In accordance with various embodiments, a hollow, lightweight, economical rain shield for tires horizontally stacked outdoors is provided.

In one aspect, a convex headed plug with at least one generally horizontal arm extending perpendicularly therefrom its vertical body and sized to lock under the bead of a conventionally sized tire, such that the arm is in contact with the tire liner is provided.

In another aspect, a domed cap with a cylindrical body having at least one helical flange formed thereabout and extending extending perpendicularly therefrom, where the helical flange has a major diameter that exceeds the bead diameter of a 15 inch vehicle tire.

In yet another aspect, a convex headed plug with a 360 degree thread with a non-symmetrical, non uniform cross sectional profile formed thereon its body that has a major diameter that exceeds the bead diameter of a 15 inch vehicle tire.

In yet a final aspect, an inflatable, rain plug having a domed proximal end connected by a transitional neck to a flanged distal end having a circular cross section ring, where the proximal end and distal ends exceed the bead diameter of a 15 inch tire.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

Figure 1:
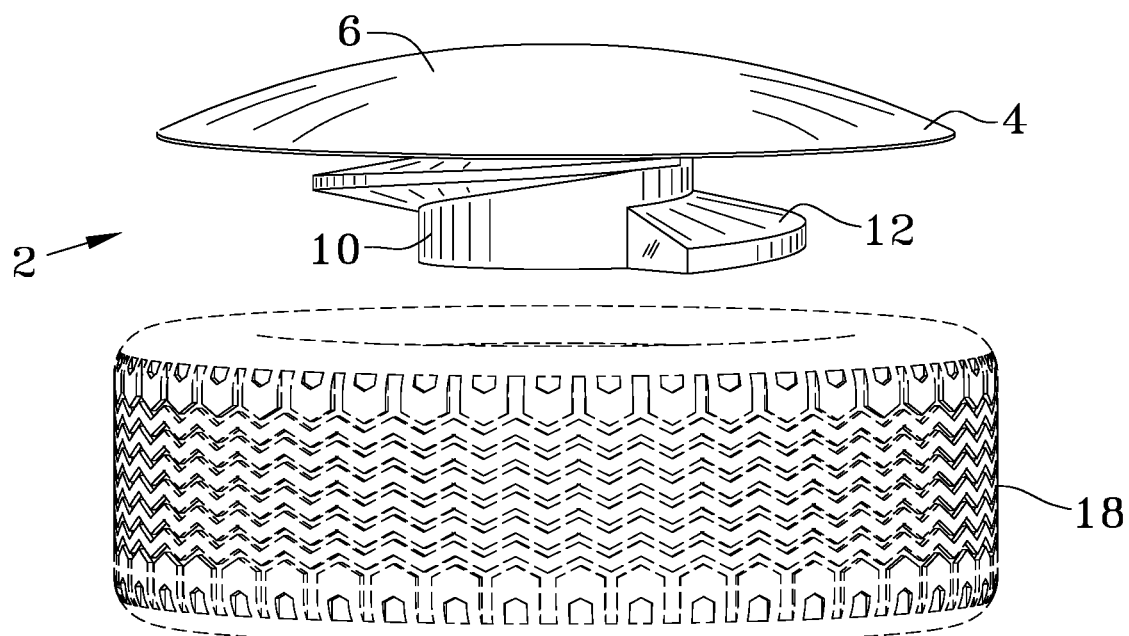
FIG. 1 is a side view of the first embodiment tire rain shield outside of a tire.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details It will be understood that, although the terms first, second, etc. may be used herein to describe various elements, these elements should not be limited by these terms. These terms are only used to distinguish one element from another It will be understood that when an element is referred to as being "on," "coupled to," or "connected to" another element, it can be directly on, directly coupled to or directly connected to the other element, or intervening elements may be present. In contrast, when an element is referred to as being "directly on", "directly coupled to," or "directly connected to" another element, there are no intervening elements present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, with reference to the thread on the device, the term "lead" which is the linear distance the screw travels in one revolution.

As used herein, with reference to the thread on the device, the term "male thread" refers to a ridge wrapped around a cylinder in the form of a helix.

As used herein with reference to direction, the term "top" refers to the upper convex top cap of the device, and "bottom" refers to the bottom face of the cylindrical body. The device is described in terms of the manner of its common usage wherein the thread (or ridge) axis is also the vertical plane. Up and down are to be interpreted in terms of this orientation.

The present invention relates to a novel design for a tire rain shield. In its preferred and second embodiments it is basically a single piece, hollow polymer plug that is engaged about the interior of a tire. That is to say, its ridge or thread (or segmented thread as in the second embodiment) is engaged beneath the upper tire bead of a horizontally disposed tire while its cap extends beyond the midpoint of the outer sidewall of the tire. In the third embodiment an inflatable design is presented.

Looking at FIGS. 1, 3, 6 and 10 it can be seen that the preferred embodiment tire rain shield 2 has three structural components formed on a hollow polymer plug. It has a circular cap 4 with a convex upper face 6 and a concave lower face 8; a right cylindrical body 10 that extends perpendicularly from the bottom face 8 of the cap 4 (so that its axis resides collinear with a vertical axis); and a helical ridge (or thread) 12 that extends horizontally from the sidewall of the body 10 and for 360 degrees about body 10 beginning at the interface of the body 10 and the concave lower face 8 of the cap 4. The tire rain shield 2 is hollow but enclosed, and as such has a circular bottom plate 24 that encloses the bottom of the body 10. There is no need for the tire rain shield 2 to have excess weight so it is made of an inexpensive lightweight resilient polymer such as polyethylene or polystyrene treated with a UV resistant inhibitor. Because it will spend its life in the sun, degradation or embrittlement of the polymer must be safeguarded against but inclusion of a UV inhibitor or a topical UV protectant coating.

Figure 2:
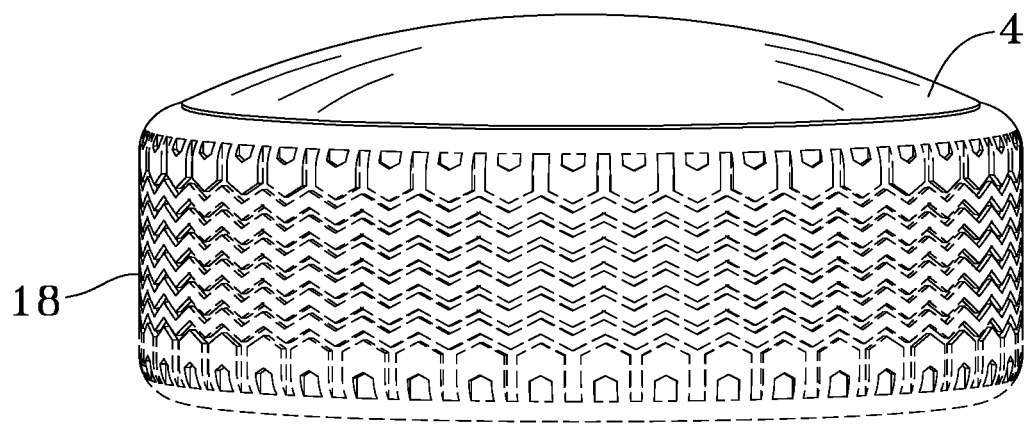
FIG. 2 is a side view of the first embodiment tire rain shield installed on a tire.
Figure 3:
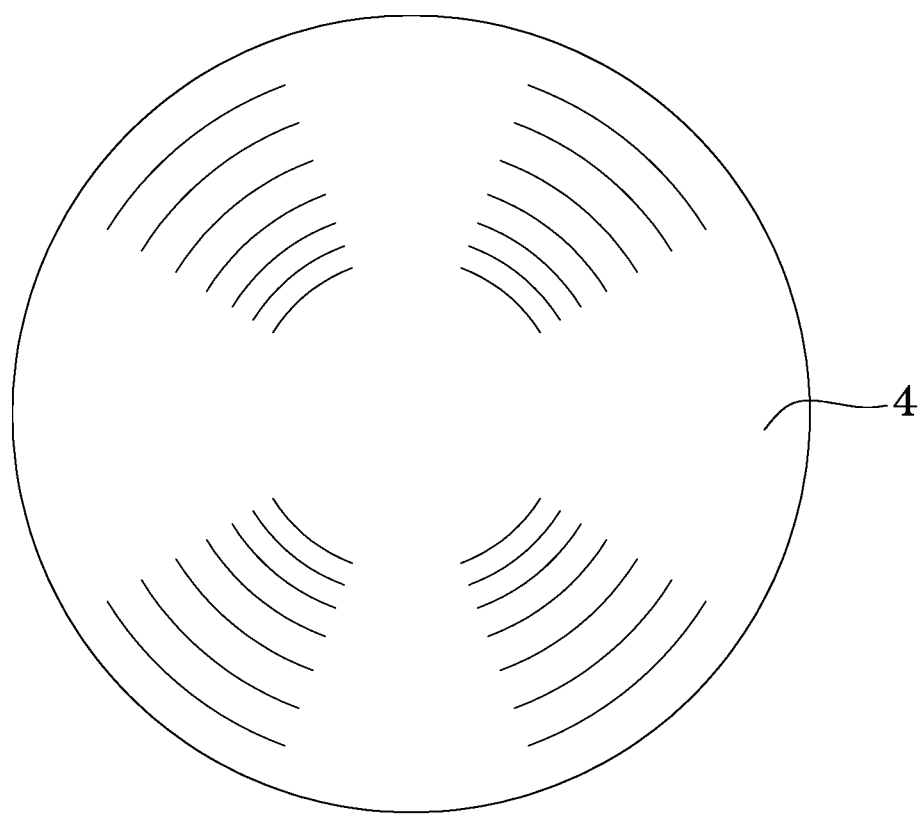
FIG. 3 is a top view of the first embodiment tire rain shield.
Figure 4:
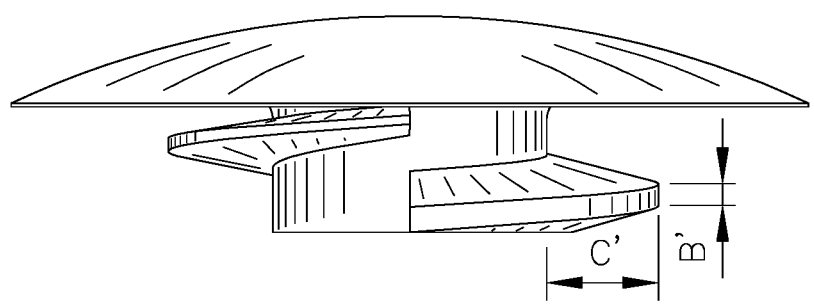
FIGS. 4, 5, 7 and 8 are side views of the first embodiment tire rain shield rotated at 90 degree increments.
Figure 5:
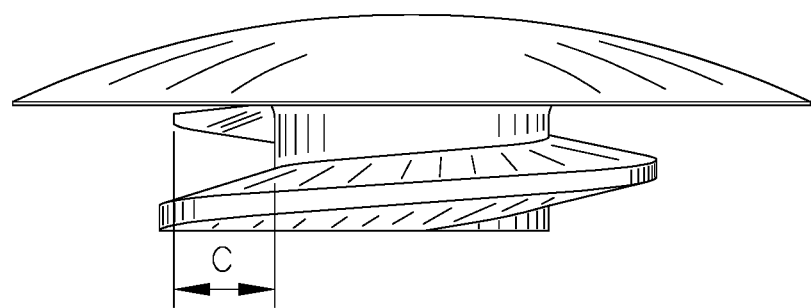
Figure 11:
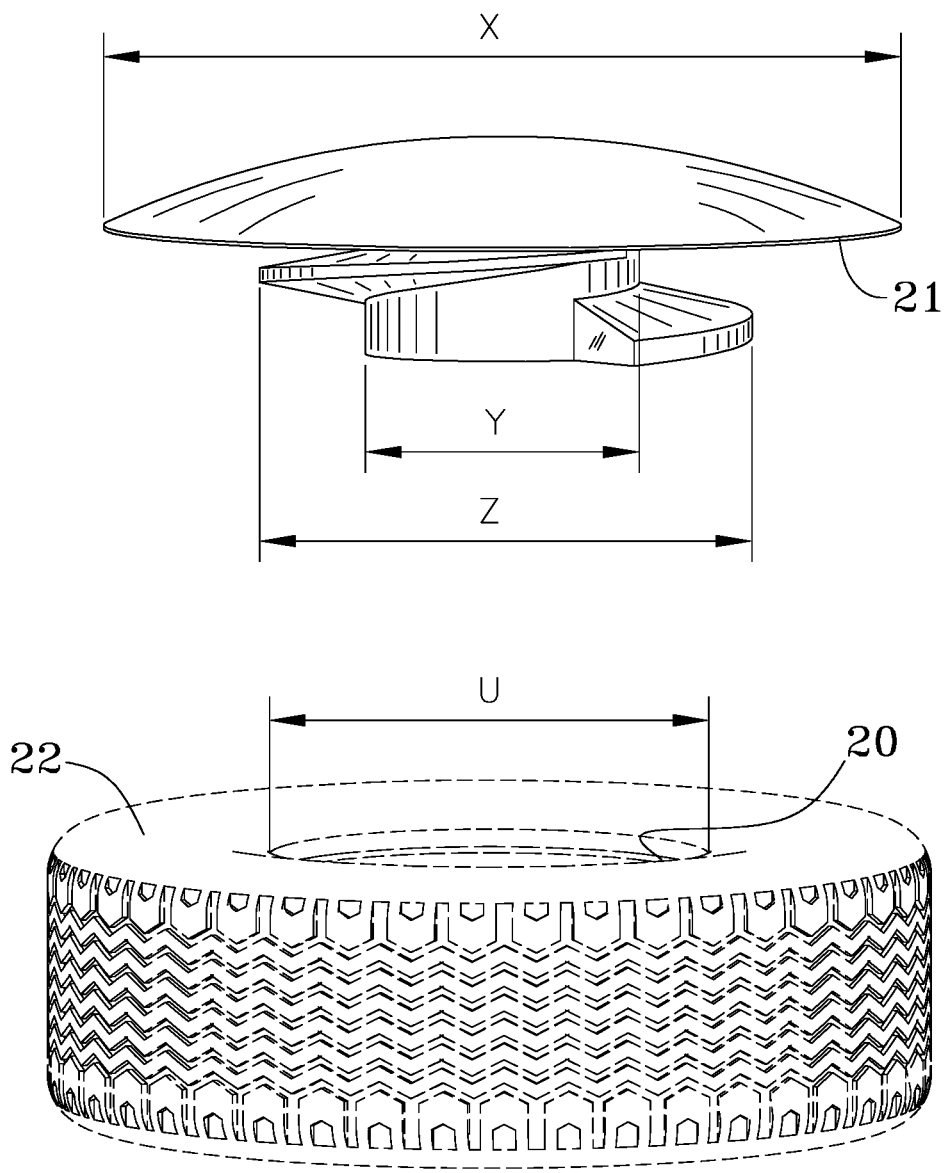
FIG. 11 is a side view of the first embodiment tire rain shield and a tire showing the dimensions.

Looking at FIGS. 2 and 11, one can see that the cap 4 extends to at least, beyond the midpoint to the sidewall of the tire 18. This prevents any rain shed from the cap 4 from running back into the tire 18. In the preferred embodiment this cap diameter, designated as dimension X on FIG. 11, will exceed the outer diameter of a 15 inch car tire. This diameter was chosen as 15 inches is the most common tire size. Since the tires this device is to protect will be stacked, a 15 inch tire will always be the top and thus only a single sized tire rain shield 2 need be fabricated. The sidewall of the top 15 inch tire will reside in contact with the sidewall of the next tire in the stack, with the outer diameter of the 15 inch tire residing beyond the midpoint of the sidewall of the lower tire. In this arrangement, since a tire's sidewall has a convex configuration, the rain shed from the cap 4 and/or the 15 inch tire 18 will strike the larger tire at a location where it will be directed away from the center of the tire. Thus a single tire rain shield 2 on a top 15 inch tire will form a waterproof seal on the entire stack of tires. This is aided because the upper face of the cap 6 is convex, and any rain contacting the cap 4 will have a velocity with an outward vector with respect to the center of the tire stack.

In practice, as rain runs off of the upper face 6 of the device 2, it is directed to the outer edge of the tire 18 (or beyond). The concavity of the lower face of the cap 8 allows the entire outer edge 21 of the cap 4 to contact the tire's sidewall 22 to form a waterproof seal. The stacking arrangement described above ensures that the remainder of tires 18 stacked below also have a waterproof seal.

Figure 10:
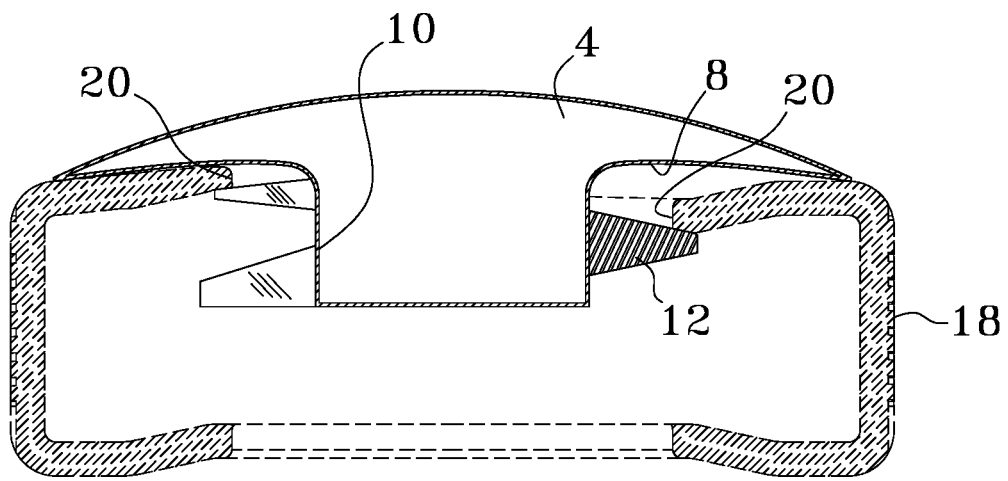
FIG. 10 is a cross sectional side view of the first embodiment tire rain shield installed onto a tire.

Looking at FIGS. 10 and 11, it can be seen that since the tire rain shield 2 is designed to fit into the tire 18 beyond the bead 20 of the tire, the minor diameter of the thread 12 (which is the diameter of the cylindrical body 10), designated as dimension Y of FIG. 11, is less than the diameter of the tire bead 20 designated as dimension U on FIG. 11 while the major diameter of the thread 12, designated as dimension Z on FIG. 11 is larger than diameter of the tire bead 20 designated as dimension U on FIG. 11.

Figure 6:
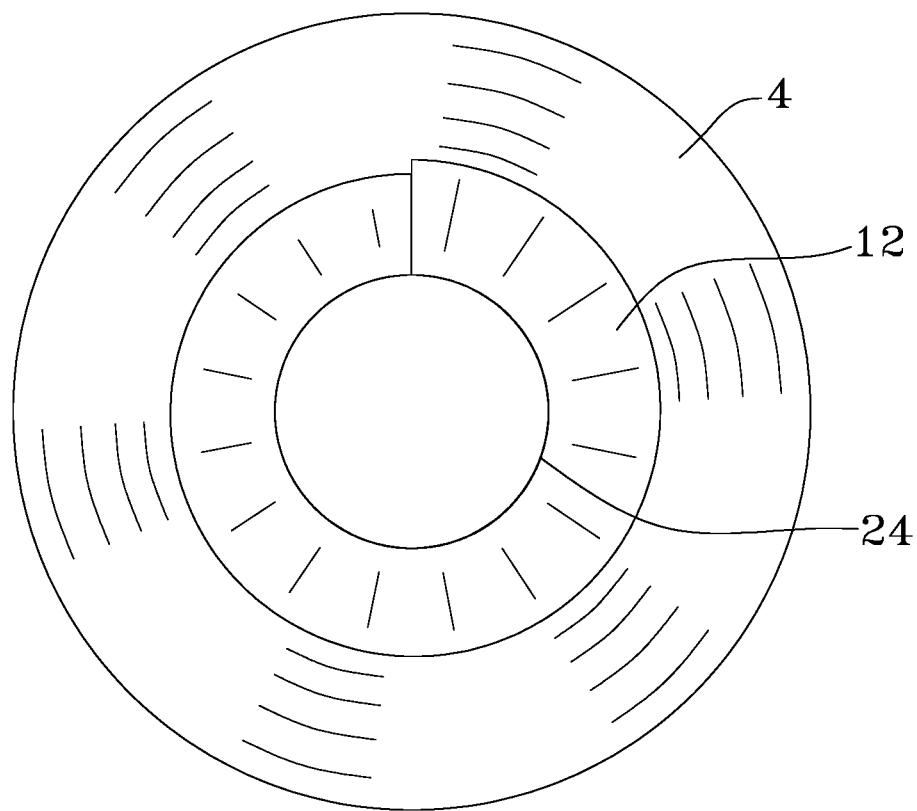
FIG. 6 is a bottom view of the first embodiment tire rain shield.
Figure 7:
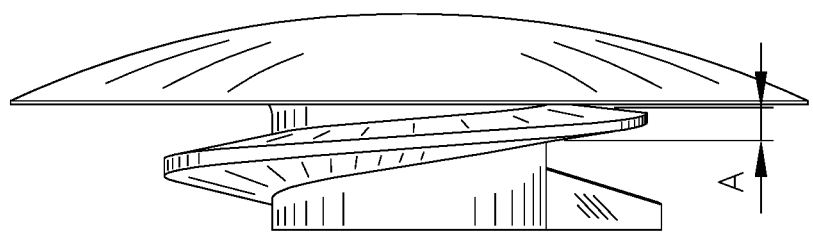
Figure 8:
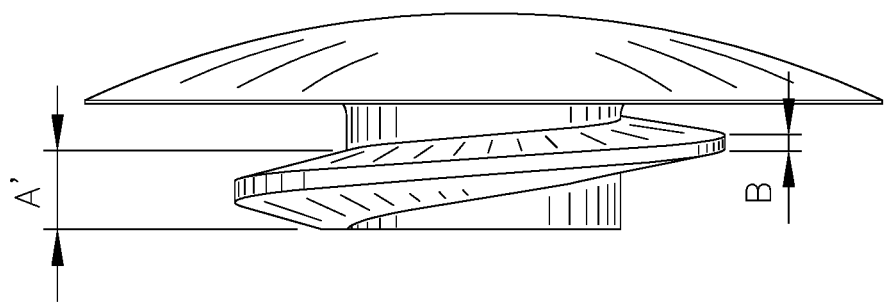

The ridge (also referred to as a male thread) 12 is formed about approximately 360 degree helix around the sidewall of the body 10 such that the axis of the thread is collinear with a vertical axis. (Approximately 360 degrees refers to a radial dimension about the axis of the thread between 380 and 340 degrees.) This helical ridge or thread 12 extends generally horizontally and perpendicularly to the axis of the body 10. The top of the thread 12 begins at the interface of the body 10 and the concave lower face 8 of the cap 4. The bottom of the thread 12 ends at the interface of the body sidewall and the base plate 24 (FIG. 6). The threadform 12 has a non-symmetrical, non-uniform cross sectional profile. It has three geometric parameters that vary along the length of the thread.

Looking sequentially at FIGS. 4, 5, 8 and 7 the three varying geometric parameters of the threadform can be seen as the device is rotated in four 90 degree increments. These are the thread thickness (designated A and A' on FIGS. 7 and 8), the thread height (designated C and C' on FIGS. 4 and 5), and the thread crest width (designated B and B' on FIGS. 4 and 8). All of these parameters increase from the top of the body 10 to the bottom of the body 10.

The threadform (which is the cross sectional shape of the thread) is commonly known as a Vee thread because it is based on an isosceles triangle that has approximately equal length sides with a truncated tip (cut short), although there is a plethora of equivalent configurations which would work equally as well, as would be known by one skilled in the art.

As such, this means the thread is a reverse taper male thread (as the taper decreases toward its top) having a non uniform cross section with a varying thread thickness and crest width. It is to be noted that the thread omnidirectional in that it may be wound in either clockwise or counterclockwise directions around the body of the device.

Described otherwise, the tire rain shield 2 has a reverse tapered male thread (if continued would constitute a decreasing conical taper down the thread) having an increasing crest that increases in width as the thread travels down the thread axis and where the thickness of the thread also increases as the thread travels down the thread axis.

To put this device 2 on the tire, s seen in FIG. 10, it is hooked over the bottom (deepest thread) of the thread and then either "popped" over the top of the thread or the tire is tilted around the thread so the inner rim (bead) of the tire passes over approximately 340 degrees of the thread. It is to be noted that since the top of the thread is formed up tight (or begins at) the domed underside of the top, the tire bead cannot completely reside over the top half of the thread. This is so that the entire tired bead does not lock over the thread making it hard to remove. With this thread form design having the thread form go completely to the underside of the domed top, there is a sufficient lock or grip on the tire that it can actually be lifted off of the ground by the device 2. Also, this design ensures that the device 2 is pulled into contact with the sidewall of the tire.

Figure 9:
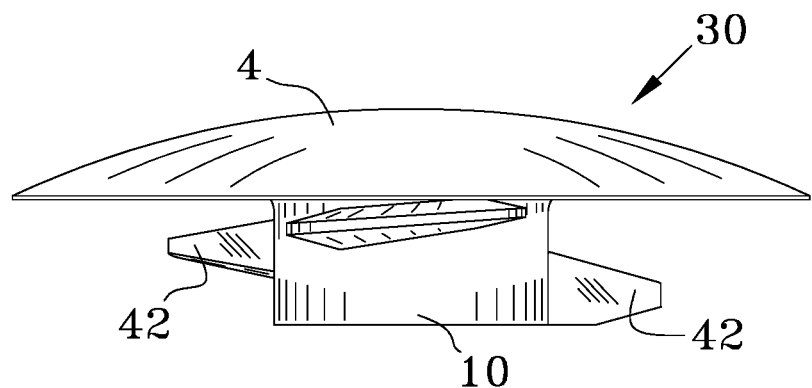
FIG. 9 is a side view of the second embodiment tire rain shield.

Looking at FIG. 9 the second embodiment 30 can be best explained. Here the cap 4 and body 10 remain unchanged but the thread 42 is an equally radial spaced multi ridge (three preferably) segmented ridge design having the same thread profile and geometric configuration as above. In operation, it is installed onto a tire identically as the preferred embodiment.

The aforementioned four distinct features of the non-symmetrical, non-uniform male reverse taper thread form makes these two designs work to easily install, firmly lock and place, release easy and draw the tire sidewall in close contact with the underside of the domed top of the device.

Figure 12:
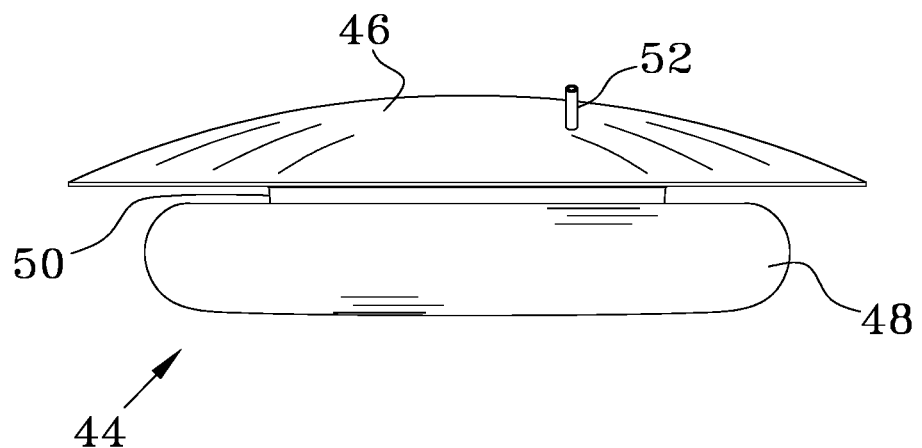
FIG. 12 is a side view of the third embodiment inflatable tire rain shield.
Figure 13:
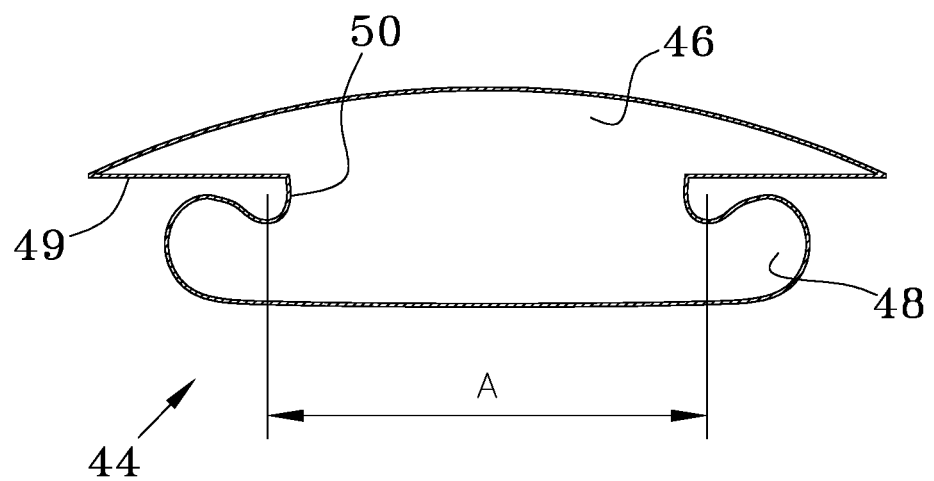
FIG. 13 is a cross sectional side view of the third embodiment tire rain shield.

FIGS. 12 and 13 illustrate the third embodiment tire rain shield 44. This embodiment is an inflatable polymer body having a conical cap 46 and a bulbous ring 48 spaced at a distance from the underside 49 of the cap 46 by neck region 50. The neck region 50 has a diameter (designated A on FIG. 13) that is less than the diameter of the tire bead 20 designated as dimension U on FIG. 11. Although shown as located on the conical cap 46, there is an inflation port 52 on the surface of the third embodiment. In operation, this embodiment is partially inflated so that the entire device is flaccid, and then the bulbous ring 48 is inserted into the tire and the device fully inflated until the neck region 50 abuts the tire bead.

While certain features and aspects have been described with respect to exemplary embodiments, one skilled in the art will recognize that numerous modifications are possible. Consequently, although several exemplary embodiments are described above, it will be appreciated that the invention is intended to cover all modifications and equivalents within the scope of the following claims.

Consequently, in view of the wide variety of permutations to the embodiments described herein, this detailed description and accompanying material is intended to be illustrative only, and should not be taken as limiting the scope of the inventive concept. What is claimed as the invention, therefore, is all such modifications as may come within the scope and spirit of the following claims and equivalents thereto.

Having thus described the invention, what is claimed as new and desired to be secured by Letters Patent is as follows:

1. A tire rain shield comprising:
an enclosed hollow polymer plug having a cap with a convex upper face and a concave lower face;
a body extending perpendicularly from said lower face, said body having a top end, a bottom end and a sidewall;
and a non-uniform helical male thread projecting horizontally from said sidewall.

2. The tire rain shield of claim 1 further comprising a ultraviolet inhibitor incorporated into said polymer plug.

3. The tire rain shield of claim 1 further comprising a topical ultraviolet protective coating applied over said tire rain shield.

4. The tire rain shield of claim 1 wherein said thread has a reverse taper male thread.

5. The tire rain shield of claim 4 wherein said thread has a varying thread thickness.

6. The tire rain shield of claim 4 wherein said thread has a varying thread height.

7. The tire rain shield of claim 4 wherein said thread has a varying thread crest width.

8. The tire rain shield of claim 4 wherein said thread has a varying thread thickness, a varying thread height and a varying thread crest width.

9. The tire rain shield of claim 1 wherein said body has a cylindrical configuration, and said thread extends for approximately 360 degrees about said body initiating at said concave lower face of said cap.

10. The tire rain shield of claim 1 wherein said thread is segmented.

\* \* \* \* \*